US012684059B2

(12) United States Patent
Liu et al.

(10) Patent No.: US 12,684,059 B2
(45) Date of Patent: Jul. 14, 2026

(54) IoT DEVICE MANAGEMENT METHOD AND TERMINAL

(71) Applicant: Huawei Technologies Co., Ltd., Shenzhen (CN)

(72) Inventors: Zhen Liu, Shenzhen (CN); Xin Zhao, Xi'an (CN)

(73) Assignee: HUAWEI TECHNOLOGIES CO. LTD., Shenzhen (CN)

( * ) Notice: Subject to any disclaimer, the term of this patent is extended or adjusted under 35 U.S.C. 154(b) by 641 days.

(21) Appl. No.: 18/044,931

(22) PCT Filed: Sep. 14, 2021

(86) PCT No.: PCT/CN2021/118248
§ 371 (c)(1),
(2) Date: Mar. 10, 2023

(87) PCT Pub. No.: WO2022/053062
PCT Pub. Date: Mar. 17, 2022

(65) Prior Publication Data
US 2023/0362292 A1 Nov. 9, 2023

(30) Foreign Application Priority Data
Sep. 14, 2020 (CN) .......................... 202010962395.9

(51) Int. Cl.
*H04M 1/72412* (2021.01)
*G16Y 10/75* (2020.01)
(Continued)

(52) U.S. Cl.
CPC ......... *H04M 1/72412* (2021.01); *G16Y 10/75* (2020.01); *G16Y 30/00* (2020.01);
(Continued)

(58) Field of Classification Search
CPC .......... H04M 1/72412; H04M 2201/40; G16Y 10/75; G16Y 30/00; H04W 4/80;
(Continued)

(56) References Cited

U.S. PATENT DOCUMENTS 9,860,076 B2 * 1/2018 Warren
10,057,125 B1 * 8/2018 Roman
(Continued)

FOREIGN PATENT DOCUMENTS

CN 202906942 U 4/2013
CN 103974457 A 8/2014
(Continued)

*Primary Examiner* — Michael A Keller
(74) *Attorney, Agent, or Firm* — Conley Rose, P.C.

(57) ABSTRACT

An internet of things (IoT) device management method includes, after receiving a first input, an IoT device that sends, by short-range communication, a first message including an identifier of the IoT device and a registration status of the IoT device. When the registration status of the IoT device indicates that the IoT device is registered, the mobile terminal displays a control interface of the IoT device. When the registration status of the IoT device indicates that the IoT device is not registered, the mobile terminal automatically starts networking for the IoT device.

20 Claims, 12 Drawing Sheets

(51) Int. Cl.
    *G16Y 30/00*        (2020.01)
    *H04W 4/80*        (2018.01)
    *H04W 60/04*      (2009.01)

(52) U.S. Cl.
    CPC ............. *H04W 4/80* (2018.02); *H04W 60/04*
                (2013.01); *H04M 2201/40* (2013.01)

(58) Field of Classification Search
    CPC ....... H04W 60/04; H04W 4/70; H04W 88/04;
             H04W 12/009; H04W 12/71; H04W
            12/08; H04L 67/12; H04L 67/52; H04L
               2012/2841; H04L 12/2809; H04L
              12/2825; H04L 41/0806; H04L 41/24
    See application file for complete search history.

(56)                References Cited

U.S. PATENT DOCUMENTS

| | | | |
|---|---|---|---|
| 2014/0191855 | A1* | 7/2014 | Kim |
| 2020/0169886 | A1* | 5/2020 | Bhatt |
| 2022/0167164 | A1 | 5/2022 | Xu |

FOREIGN PATENT DOCUMENTS

| | | | | | |
|---|---|---|---|---|---|
| CN | 105917626 | A | 8/2016 | | |
| CN | 106125570 | A | 11/2016 | | |
| CN | 106713113 | A | 5/2017 | | |
| CN | 110519131 | A | 11/2019 | | |
| CN | 110601870 | A | 12/2019 | | |
| CN | 110830270 | A | 2/2020 | | |
| EP | 3979571 | A1 | 4/2022 | | |
| KR | 20210001730 | A * | 1/2021 | ......... | H04L 63/0876 |
| WO | 2015026389 | A2 | 2/2015 | | |

\* cited by examiner

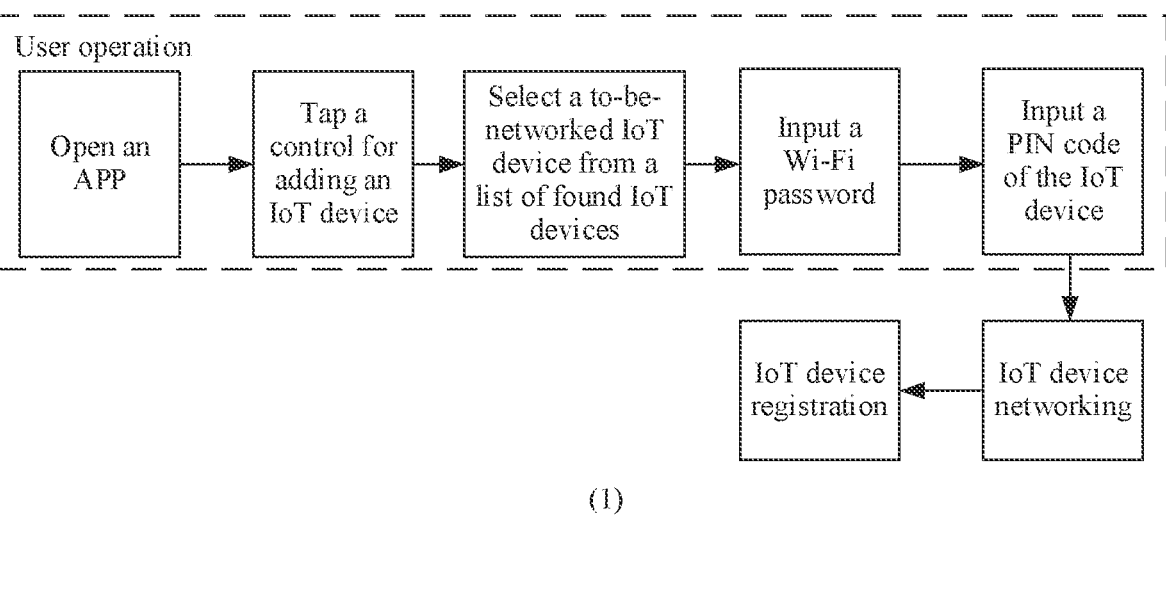
(1)
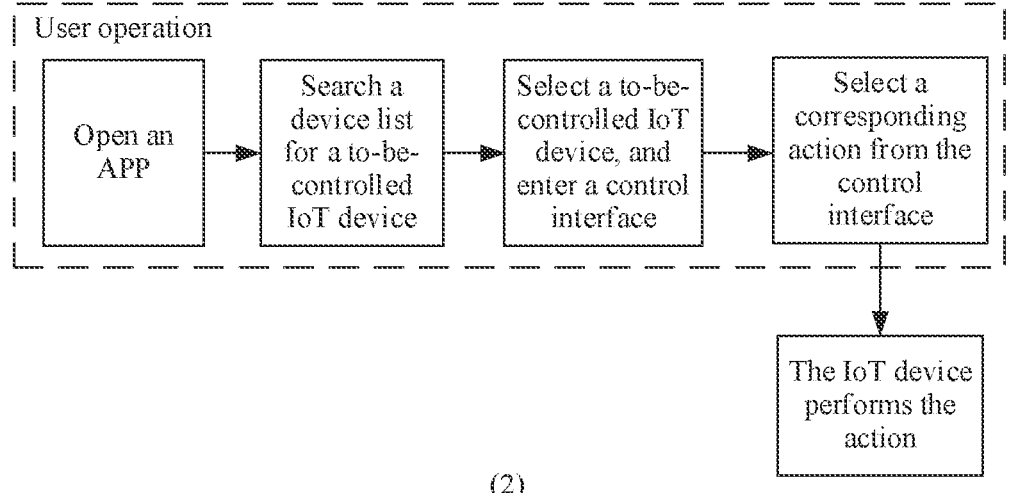
(2)
FIG. 1

| Application layer | | | | | | |
|---|---|---|---|---|---|---|
| | Camera | Calendar | Map | WLAN | Music | Messages |
| | Gallery | Phone | Navigation | Bluetooth | First application | ... |

| Application framework layer | | | | |
|---|---|---|---|---|
| | Window manager | Content provider | Phone manager | Resource manager |
| | Notification manager | View system | IoT device management module | ... |

| System library | | | |
|---|---|---|---|
| | Surface manager | 3D graphics processing library | Android runtime |
| | 2D graphics engine | Media library ... | |

| Kernel layer | | |
|---|---|---|
| | Display driver | Camera driver |
| | Audio driver | Sensor driver ... |

FIG. 3B

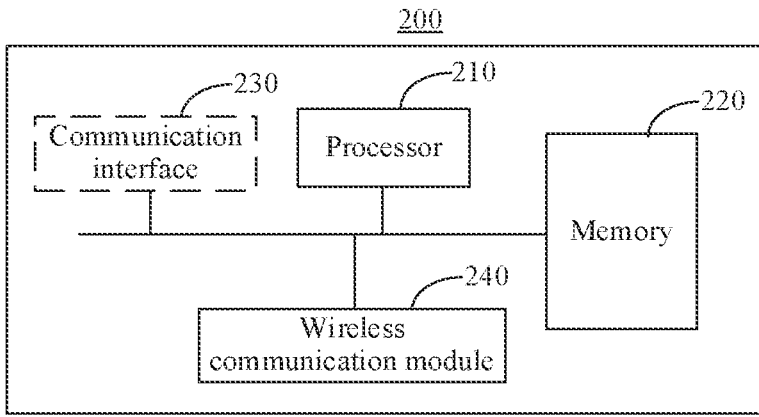

200

230 — Communication interface
210 — Processor
220 — Memory
240 — Wireless communication module

FIG. 4

IoT DEVICE MANAGEMENT METHOD AND TERMINAL

CROSS-REFERENCE TO RELATED APPLICATIONS

This is a U.S. National Stage of International Patent Application No. PCT/CN2021/118248 filed on Sep. 14, 2021, which claims priority to Chinese Patent Application No. 202010962395.9 filed on Sep. 14, 2020. Both of the aforementioned applications are hereby incorporated by reference in their entireties.

TECHNICAL FIELD

This application relates to the internet of things (IoT) field, and in particular, to an IoT device management method and a terminal.

BACKGROUND

With rapid development of internet of things technologies, more IoT devices access a home network. A user may access and manage the IoT device by installing an application (application, APP) (or referred to as a home APP, an IoT APP, or the like) such as "smart life" on a mobile terminal.

For example, (1) in FIG. 1 is a schematic flowchart of networking an IoT device through an APP on a mobile phone. Specifically, the user needs to open the APP on the mobile phone and then tap a control for adding an IoT device, and the mobile phone starts to scan surrounding IoT devices. The mobile phone displays a list of surrounding IoT devices obtained through scanning, and the user selects a to-be-networked IoT device from the list, and inputs a Wi-Fi network password, a PIN of the IoT device, and the like. Then, the mobile phone starts to network and register with the IoT device. It can be learned that the user needs to perform at least five steps in the procedure of networking the IoT device. For another example, (2) in FIG. 1 is a schematic flowchart of controlling an IoT device through an APP on a mobile phone. Specifically, the user needs to open the APP, search a list of JOT devices for a to-be-controlled IoT device, select the to-be-controlled IoT device, enter a control interface, and select, from the control interface, an action to be performed by the IoT device. Then, the user sends a control command to the IoT device, and the IoT device performs a corresponding action. It can be learned that the user needs to perform at least four steps in the procedure of controlling the IoT device. In conclusion, in the existing solution of managing and controlling the IoT device through the APP in the industry, user operations are redundant and cumbersome.

SUMMARY

This application provides an IoT device management method and a terminal, capable of simplifying user operations, implementing user-unburdening networking and one-touch control experience, and enhancing user experience.

To achieve the foregoing objectives, embodiments of this application provide the following technical solutions.

According to a first aspect, an IoT device management system is provided, including: a mobile terminal and an IoT device. The IoT device has a short-range communication capability. The mobile terminal stores networking information, and communicates with a server by using the networking information. The IoT device is configured to receive a first input and send a first message in a short-range communication manner, where the first message includes an identifier of the IoT device and a registration status of the IoT device. The mobile terminal is configured to receive, within a preset distance from the IoT device, the first message sent by the IoT device. The mobile terminal is further configured to: when the registration status indicates that the IoT device is not registered, request a registration code of the IoT device from the server, and send the registration code and the networking information to the IoT device, where the registration code and the networking information are used by the IoT device to apply to the server for registration.

The short-range communication manner may be NFC, Wi-Fi Aware, Bluetooth low energy, or the like.

It may be understood that when the IoT device sends first information in the short-range communication manner, another device (for example, a mobile terminal) can receive the first information only within a very short distance (that is, a distance threshold) from the IoT device, That is, in a real use scenario, if a device can receive the first information sent by the IoT device, it indicates that the device is close to the IoT device, and the device may be considered as a trusted device of the IoT device. In this specification, a distance range in which a very short distance wireless signal sent by the IoT device can be received may be referred to as a safe distance. That is, a very short safe wireless communication distance is used in this embodiment of this application to physically ensure security of sending the first information by the IoT device.

It can be learned that after the mobile terminal is close to the IoT device, if the IoT device is not registered, the mobile terminal may automatically perform networking for the IoT device. In addition, in the networking flow of the IoT device, the user does not need to perform some complex operations, such as scanning a tag of the IoT device and selecting a Wi-Fi network password and a PIN of the IoT device. It can be learned that the method provided in this embodiment of this application simplifies user operations, and achieves an effect of unburdening networking.

In a possible implementation, the IoT device is further configured to: after receiving the first input, or before sending the first message, prompt a user to move the mobile terminal close to the IoT device, where a prompting manner of the IoT device includes one or more of playing a prompt voice, blinking an indicator light, and displaying a prompt interface.

The user moves the mobile terminal close to the IoT device, so that the mobile terminal is within the preset distance from the IoT device to receive the first message.

In a possible implementation, the first input includes: any one of an operation of powering on the IoT device, an operation for a specific key on the IoT device, an operation of instructing the IoT device to enter a networking mode, and an operation of restarting the IoT device.

In a possible implementation, the identifier of the IoT device includes one or more of a device model, a personal identification number PIN, and a media access control MAC address.

The device model may be used for identifying the IoT device. Generally, the IoT device is named by the device model, and a device icon corresponding to the IoT device is determined according to the device model. The PIN is a root key for key negotiation in the subsequent networking process, and is used for security authentication. The MAC address is a unique identifier of the IoT device, and is used for distinguishing other IoT devices. A networking status is used for identifying whether the IoT device is networked, and the mobile terminal performs different flows subsequently according to the networking status.

In a possible implementation, the mobile terminal is further configured to: receive a message that is sent by the server and that indicates that the IoT device is registered successfully, and update the registration status of the IoT device.

In a possible implementation, the mobile terminal is further configured to display a control interface when the registration status indicates that the IoT device is registered, where the control interface includes a control for controlling an IoT device.

It can be learned that after the mobile terminal is close to the IoT device, if the IoT device is not registered, the mobile terminal may automatically perform networking for the IoT device and display the control interface. If the IoT device is registered, the mobile terminal may display the control interface. In this way, the user may directly operate the control interface and start to control the IoT device. That is, the method provided in this embodiment of this application can automatically perform different flows, networking, or control according to the networking status of the IoT device, thereby simplifying user operations, achieving one-click touch control experience, and helping enhance user stickiness.

In addition, when being close to the IoT device, the mobile terminal may obtain the unique MAC address of the IoT device. When there are a plurality of IoT devices of a same device model in a surrounding environment, the mobile terminal may alternatively perform networking and operations on the IoT device close to the user.

In a possible implementation, that the mobile terminal displays a control interface when the registration status indicates that the IoT device is registered includes: After receiving the first message, the mobile terminal displays the control interface when the registration status indicates that the IoT device is registered; or after receiving the message that is sent by the server and that indicates that the IoT device is registered successfully, the mobile terminal displays the control interface when the mobile terminal updates the registration status of the IoT device to "registered".

It may be understood that the mobile terminal controls the IoT device in a GUI management mode, which may not be affected by noise of a surrounding environment and the like, has better robustness, and helps control the IoT device more accurately.

In a possible implementation, that the mobile terminal displays a control interface when the registration status indicates that the IoT device is registered includes: The mobile terminal automatically enables a first application, and displays the control interface of the first application; or the mobile terminal invokes a system service, and displays a pop-up window including the control interface.

In some examples, the mobile terminal may automatically enable the first application, and use the first application to implement a function of controlling the IoT device by the user. In some other examples, the mobile terminal may alternatively sink, to a framework layer, a capability and data in the first application that are related to a networking flow and a control flow. That is, a service in the first application that is related to the networking flow and the control flow is set as a system service. In this way, after receiving the first message, the mobile terminal may not enable the first application, but directly use the system service to display the control interface of the IoT device, so as to control the IoT device by the user.

In a possible implementation, the mobile terminal is further configured to play a voice when the registration status indicates that the IoT device is registered, to prompt a user to control the IoT device through the voice.

In a possible implementation, that the mobile terminal plays a voice when the registration status indicates that the IoT device is registered, to prompt a user to control the IoT device through the voice includes: After receiving the first message, the mobile terminal plays the voice when the registration status indicates that the IoT device is registered; or after receiving the message that is sent by the server and that indicates that the IoT device is registered successfully, the mobile terminal plays the voice when the mobile terminal updates the registration status of the IoT device to "registered".

It should be noted that, in an existing VUI management mode, a user needs to wake up a control device (that is, a mobile terminal) by speaking a wake-up word, and then receive a voice command of the user. In this solution, the user does not need to speak any wake-up word. In addition, in the existing VUI management mode, a device model of an IoT device generally represents the IoT device. For example, the user says "turn on the smart speaker". The smart speaker is a device that the user desires to control. However, when there are a plurality of IoT devices of a same device model in a surrounding environment, the control device cannot identify an IoT device that the user desires to enable. Then, in the solution of this application, when the user moves the mobile terminal close to an IoT device, the first information sent by the IoT device includes both a device model of the IoT device and a MAC address of the IoT device, which may be used for identifying the IoT device that the user currently desires to control.

According to a second aspect, a mobile terminal is provided, including a processor and a memory, where the memory is coupled to the processor, the memory is configured to store computer program code, the computer program code includes computer instructions, and when the processor reads the computer instructions from the memory, the mobile terminal is enabled to perform the following operations: receiving, within a preset distance from an IoT device, a first message sent by the IoT device, where the first message includes an identifier of the IoT device and a registration status of the IoT device, and the first message is sent by the IoT device in a short-range communication manner; and when the registration status indicates that the IoT device is not registered, requesting a registration code of the IoT device from a server, and sending the registration code and locally stored networking information to the IoT device, where the registration code and the networking information are used by the IoT device to apply to the server for registration.

In a possible implementation, the identifier of the IoT device includes one or more of a device model, a personal identification number PIN, and a media access control MAC address.

In a possible implementation, the mobile terminal further performs the following operations: receiving a message that is sent by the server and that indicates that the IoT device is registered successfully, and updating the registration status of the IoT device.

In a possible implementation, the mobile terminal further performs the following operation: displaying a control interface when the registration status indicates that the IoT device is registered, where the control interface includes a control for controlling an IoT device.

In a possible implementation, the displaying, by the mobile terminal, a control interface when the registration status indicates that the IoT device is registered includes: after receiving the first message, displaying, by the mobile terminal, the control interface when the registration status indicates that the IoT device is registered; or after receiving the message that is sent by the server and that indicates that the IoT device is registered successfully, displaying, by the mobile terminal, the control interface when the mobile terminal updates the registration status of the IoT device to "registered".

In a possible implementation, the displaying, by mobile terminal, a control interface when the registration status indicates that the IoT device is registered includes: automatically enabling, by the mobile terminal, a first application, and displaying the control interface of the first application; or invoking, by the mobile terminal, a system service, and displaying a pop-up window including the control interface.

In a possible implementation, the mobile terminal further performs the following operation: playing a voice when the registration status indicates that the IoT device is registered, to prompt a user to control the IoT device through the voice.

In a possible implementation, the playing, by the mobile terminal, a voice when the registration status indicates that the IoT device is registered, to prompt a user to control the IoT device through the voice includes: after receiving the first message, playing, by the mobile terminal, the voice when the registration status indicates that the IoT device is registered; or after receiving the message that is sent by the server and that indicates that the IoT device is registered successfully, playing, by the mobile terminal, the voice when the mobile terminal updates the registration status of the IoT device to "registered".

According to a third aspect, an IoT device is provided, including a processor, a memory, and a short-range communication module, where the memory and the short-range communication module are coupled to the processor, the memory is configured to store computer program code, the computer program code includes computer instructions, and when the processor reads the computer instructions from the memory, the IoT device is enabled to perform the following operations: receiving a first input, and sending a first message by using the short-range communication module, where the first message includes an identifier of the IoT device and a registration status of the IoT device, and the identifier of the IoT device and the registration status of the IoT device are used to indicate a mobile terminal to apply for a registration code of the IoT device, and return, to the IoT device, the registration code and networking information that are stored in the mobile terminal; and after receiving the registration code and the networking information that are returned by the mobile terminal, applying to a server for registration.

In a possible implementation, the IoT device further performs the following operation: after receiving the first input, or before sending the first message, prompting a user to move the mobile terminal close to the IoT device, where a prompting manner of the IoT device includes one or more of playing a prompt voice, blinking an indicator light, and displaying a prompt interface.

In a possible implementation, the first input includes: any one of an Operation of powering on the IoT device, an operation for a specific key on the IoT device, an operation of instructing the IoT device to enter a networking mode, and an operation of restarting the IoT device.

In a possible implementation, the identifier of the IoT device includes one or more of a device model, a personal identification number PIN, and a media access control MAC address.

According to a fourth aspect, an IoT device management method is provided, applied to a mobile terminal. The method includes: receiving, within a preset distance from an IoT device, a first message sent by the IoT device, where the first message includes an identifier of the IoT device and a registration status of the IoT device, and the first message is sent by the IoT device in a short-range communication manner; and when the registration status indicates that the IoT device is not registered, requesting a registration code of the IoT device from a server, and sending the registration code and locally stored networking information to the IoT device, where the registration code and the networking information are used by the IoT device to apply to the server for registration.

In a possible implementation, the identifier of the IoT device includes one or more of a device model, a personal identification number PIN, and a media access control MAC address.

In a possible implementation, the method further includes: receiving a message that is sent by the server and that indicates that the IoT device is registered successfully, and updating the registration status of the IoT device.

In a possible implementation, the method further includes: displaying a control interface when the registration status indicates that the IoT device is registered, where the control interface includes a control for controlling an IoT device.

In a possible implementation, the displaying a control interface when the registration status indicates that the IoT device is registered includes: after receiving the first message, displaying the control interface when the registration status indicates that the IoT device is registered; or after receiving the message that is sent by the server and that indicates that the IoT device is registered successfully, displaying the control interface when updating the registration status of the IoT device to "registered".

In a possible implementation, the displaying a control interface when the registration status indicates that the IoT device is registered includes: automatically enabling a first application, and displaying the control interface of the first application; or invoking a system service, and displaying a pop-up window including the control interface.

In a possible implementation, the method further includes: playing a voice when the registration status indicates that the IoT device is registered, to prompt a user to control the IoT device through the voice.

In a possible implementation, the playing a voice when the registration status indicates that the IoT device is registered, to prompt a user to control the IoT device through the voice includes: after receiving the first message, playing the voice when the registration status indicates that the IoT device is registered; or after receiving the message that is sent by the server and that indicates that the IoT device is registered successfully, playing the voice when the mobile terminal updates the registration status of the IoT device to "registered".

According to a fifth aspect, an IoT device management method is provided, applied to the IoT device. The method includes: receiving a first input, and sending a first message by using a short-range communication module, where the first message includes an identifier of the IoT device and a registration status of the IoT device, and the identifier of the IoT device and the registration status of the IoT device are used to indicate a mobile terminal to apply for a registration code of the IoT device, and return, to the IoT device, the registration code and networking information that are stored in the mobile terminal; and after receiving the registration code and the networking information that are returned by the mobile terminal, applying to a server for registration.

In a possible implementation, the method further includes: after receiving the first input, or before sending the first message, prompting a user to move the mobile terminal close to the IoT device, where a prompting manner of the IoT device includes one or more of playing a prompt voice, blinking an indicator light, and displaying a prompt interface.

In a possible implementation, the first input includes: any one of an operation of powering on the IoT device, an operation for a specific key on the IoT device, an operation of instructing the IoT device to enter a networking mode, and an operation of restarting the IoT device.

In a possible implementation, the identifier of the IoT device includes one or more of a device model, a personal identification number PIN, and a media access control MAC address.

According to a sixth aspect, a computer program product is provided. When the computer program product is run on a computer, the computer is enabled to perform the method according to any one of the foregoing aspects and the possible implementations of the foregoing aspects.

According to a seventh aspect, a chip system is provided, including a processor. When the processor performs instructions, the processor performs the method according to any one of the foregoing aspects and the possible implementations of the foregoing aspects.

According to an eighth aspect, an apparatus is provided. The apparatus is included in a mobile terminal, and the apparatus has a function of implementing behavior of the mobile terminal in any method in the foregoing aspects and the possible implementations. The function may be implemented by hardware, or may be implemented by hardware executing corresponding software. The hardware or the software includes at least one module or unit corresponding to the foregoing function, for example, a receiving module or unit, a display module or unit, a processing module or unit, and the like.

According to a ninth aspect, an apparatus is provided. The apparatus is included in an IoT device, and the apparatus has a function of implementing behavior of the IoT device in any method in the foregoing aspects and the possible implementations. The function may be implemented by hardware, or may be implemented by hardware executing corresponding software. The hardware or the software includes at least one module or unit corresponding to the foregoing function, for example, a receiving module or unit, a sending module or unit, and the like.

According to a tenth aspect, a computer-readable storage medium is provided, including computer instructions. When the computer instructions are run on a mobile terminal, the mobile terminal is enabled to perform the method according to any one of the foregoing aspects and the possible implementations of the foregoing aspects.

BRIEF DESCRIPTION OF DRAWINGS

FIG. 1 is a schematic diagram of a process of networking and control on an IoT device in the conventional technology;

FIG. 3B is a schematic diagram of a structure of another mobile terminal according to an embodiment of this application;

FIG. 4 is a schematic diagram of a structure of an IoT device according to an embodiment of this application;

FIG. 7B-1 and FIG. 7B-2 are a schematic diagram of graphical user interfaces of still some mobile terminals according to an embodiment of this application;

DESCRIPTION OF EMBODIMENTS

Figure 2:
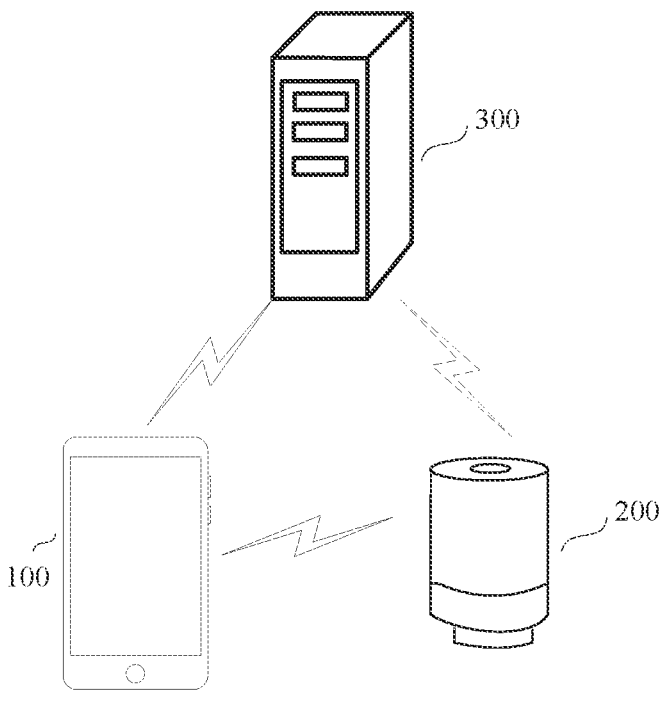
FIG. 2 is a schematic diagram of a system architecture of an application scenario according to an embodiment of this application.

In the descriptions of embodiments of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists.

The terms "first" and "second" mentioned below are merely intended for a purpose of description, and shall not be understood as an indication or implication of relative importance or implicit indication of the number of indicated technical features. Therefore, a feature limited by "first" or "second" may explicitly indicate or implicitly include one or more such features. In the description of the embodiments of this application, unless otherwise specified, "a plurality of" means two or more than two.

In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "for example" or "example" or the like is intended to present a relative concept in a specific manner.

Currently, with emergence of intelligent devices such as smart speakers and smart screens, a voice user interface (Voice User Interface, VUI) management mode can simplify, to some extent, user operations involved in networking and control flows of an IoT device. Generally, in the VUI management mode, a user needs to wake up a smart speaker or a smart screen at home by speaking a wake-up word, and then control the device through a voice command. However, the VUI management mode still has some defects. For example, the VUI management mode is not applicable to some flows that strongly depend on APP operations, for example, networking of an IoT device. For another example, in the VUI management mode, voice recognition and semantic recognition are required for the voice command delivered by the user. When the environment is relatively noisy, a voice recognition error or a semantic recognition error is easily caused, and further, a control result for an IoT device is different from a user expectation. For another example, if there are a plurality of IoT devices of a same type or model at home, each IoT device may not be accurately controlled by using a voice command. For another example, each time an IoT device is controlled, a user needs to speak a wake-up word to wake up a smart speaker or a smart screen, resulting in poor user experience. Therefore, an IoT device control method according to embodiments of this application can simplify user operations, implement user-unburdening networking and one-click touch control experience, and help enhance user experience.

FIG. 2 is a schematic diagram of a system architecture in an application scenario according to an embodiment of this application. The system architecture includes at least one mobile terminal 100, at least one IoT device 200, and a server 300.

The foregoing mobile terminal 100 is configured to bind the IoT device 200. The mobile terminal 100 may perform networking for the IoT device 200, control the IoT device 200 to perform a corresponding action, and the like. In some examples, the mobile terminal 100 may be, for example, a mobile phone, a tablet computer, a personal computer (personal computer, PC), a personal digital assistant (personal digital assistant, PDA), a smart watch, a netbook, a wearable electronic device, or the like. A specific form of the mobile terminal 100 is not specially limited in this application.

The foregoing IoT device 200 may be, for example, a hardware device of a smart home, and may include a mobile terminal, a household appliance, a sensor device, and the like. For example, the IoT device 200 may be a smartphone, a smart speaker, a smart refrigerator, a smart television, a smart lamp, a smart socket, an air purifier, a humidifier, a smart hood, a smart desk lamp, a smart door lock, a smart patch board, a smart electromagnetic oven, a smart camera, or the like. The IoT device 200 may alternatively be a smoke sensor, a human body sensor, a temperature sensor, a humidity sensor, a door/window sensor, a PM2.5 air sensor, or the like.

The foregoing server 300 may be, for example, a cloud server, a home cloud server, or the like, and may alternatively be a server cluster including a plurality of servers. In some embodiments, the mobile terminal 100 may request the server 300 to register the IoT device 200. In this way, the server 300 records home APP account information bound to the IoT device 200, That is, the server 300 stores related control information of the IoT device 200, for example, an account of a home application Tor example, a "smart life" application) or an IoT device application (for example, a smart speaker application) to which the IoT device 200 logs in, a device identifier of the IoT device 200, and the like. Further, when the mobile terminal 100 needs to control the IoT device 200 to perform a corresponding action, the server 300 may deliver a corresponding control command to the IoT device 200.

Figure 3A:
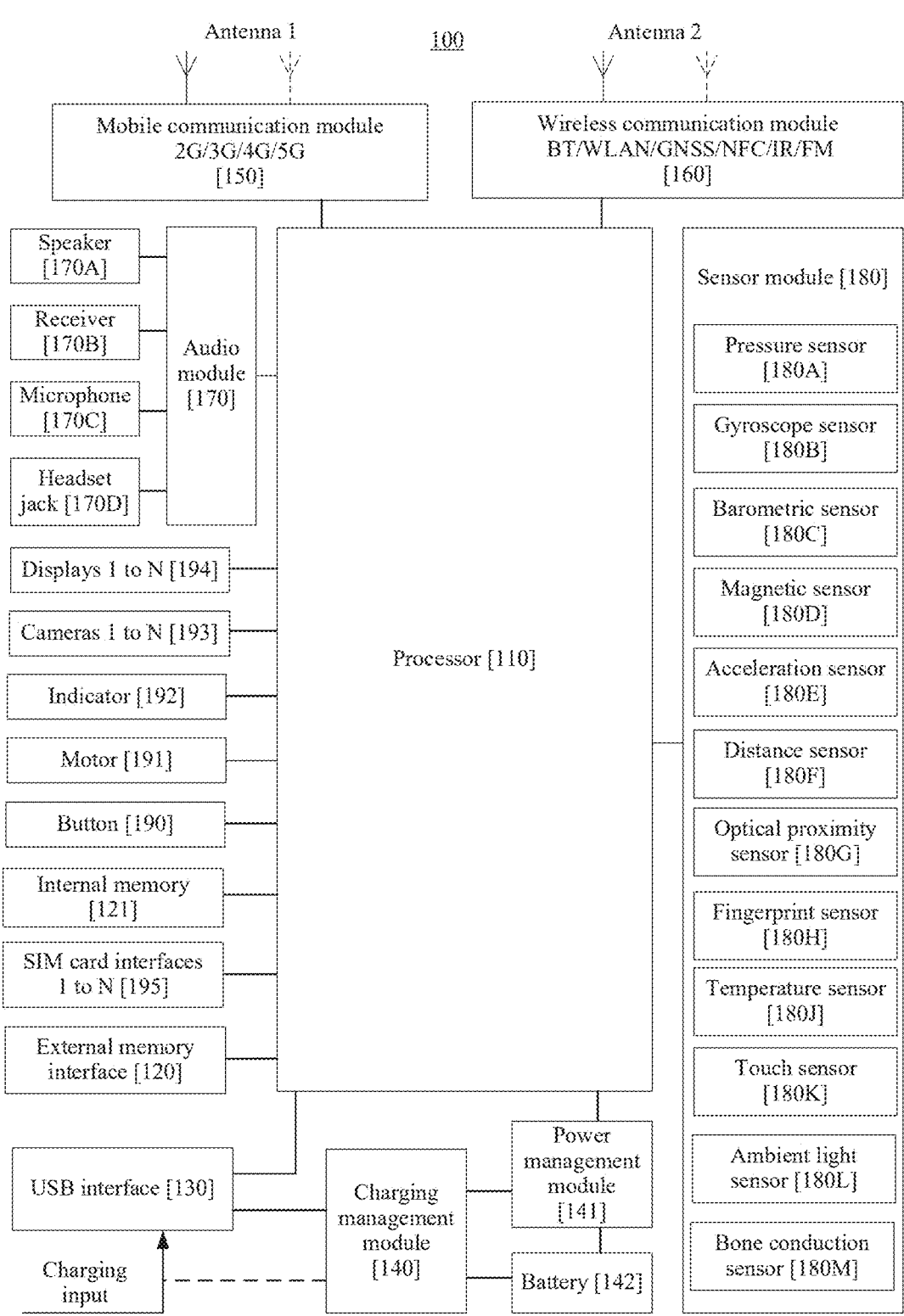
FIG. 3A is a schematic diagram of a structure of a mobile terminal according to an embodiment of this application.

Refer to FIG. 3A. FIG. 3A shows a schematic diagram of a structure of a mobile terminal 100.

The mobile terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric sensor 180C, a magnetic sensor 180D, an acceleration sensor 180E, a distance sensor 180F, an optical proximity sensor 180G, a fingerprint sensor 180H, a temperature sensor 180J, a touch sensor 180K, and an ambient light sensor 180L, a bone conduction sensor 180M, and the like.

It may be understood that the structure shown in this embodiment of this application does not constitute a specific limitation on the mobile terminal 100. In some other embodiments of this application, the mobile terminal 100 may include more or fewer components than those shown in the figure, or combine some components, or split some components, or have different component arrangements. The components shown in the figure may be implemented in hardware, software, or a combination of software and hardware.

The processor 110 may include one or more processing units. For example, the processor 110 may include an application processor (application processor, AP), a modem processor, a graphics processor (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU), and the like. Different processing units may be independent components, or may be integrated into one or more processors.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, universal serial bus (universal serial bus, USB) port, and/or the like.

It may be understood that an interface connection relationship between the modules shown in this embodiment of this application is merely an example for description, and does not constitute a limitation on the structure of the mobile terminal 100. In some other embodiments of this application, the mobile terminal 100 may alternatively use an interface connection manner different from that in the foregoing embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the mobile terminal 100. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery state of health (electric leakage or impedance). In some other embodiments, the power management module 141 may alternatively be disposed in the processor 110. In some other embodiments, the power management module 141 and the charging management module 140 may be alternatively disposed in a same component.

A wireless communication function of the mobile terminal 100 may be implemented by the antenna 1, the antenna 2, the mobile communication module 150, the wireless communication module 160, the modem processor, the baseband processor, and the like.

The mobile communication module 150 may provide a solution, applied to the mobile terminal 100, to wireless communication including 2G, 3G, 4G, 5G, and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave through the antenna 1 for radiation. In some embodiments, at least some function modules of the mobile communication module 150 may be disposed in the processor 110. In some embodiments, at least some function modules of the mobile communication module 150 may be disposed in a same device as at least some modules of the processor 110.

The wireless communication module 160 may provide a wireless communication solution that is applied to the mobile terminal 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication. NFC) technology, an infrared (infrared, IR) technology, or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave through the antenna for radiation.

In some embodiments, in the mobile terminal 100, the antenna 1 is coupled to the mobile communication module 150, and the antenna 2 is coupled to the wireless communication module 160, so that the mobile terminal 100 can communicate with a network and another device through a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time division-synchronous code division multiple access (time division-synchronous code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system. GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The mobile terminal 100 implements a display function through the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs that perform program instructions to generate or change display information.

The mobile terminal 100 may implement a photographing function through the ISP, the camera 193, the video codec, the GPU, the display 194, the application processor, and the like.

The internal memory 121 may be configured to store a computer-executable program code. The executable program code includes instructions. The internal memory 121 may include a program storage area and a data storage area. The program storage area may store an operating system, an application required for at least one function (such as a sound play function and an image play function), and the like. The data storage area may store data (such as audio data and a phone book) created in a process of using the mobile terminal 100. In addition, the internal memory 121 may include a high-speed random access memory, and may further include a non-volatile memory, for example, at least one magnetic disk storage device, a flash memory, a universal flash storage (universal flash storage, UFS), and the like. The processor 110 performs various functional applications and data processing of the mobile terminal 100 by running the instructions stored in the internal memory 121 and/or the instructions stored in the memory disposed in the processor.

The mobile terminal 100 may implement an audio function such as music playing and recording through the audio module 170, the speaker 170A, the receiver 170B, the microphone 170C, the headset jack 170D, the application processor, and the like.

A software system of the mobile terminal 100 may employ a layered architecture, an event-driven architecture, a microkernel architecture, a microservice architecture, or a cloud architecture. In this embodiment of this application, an Android system of a layered architecture is used as an example to describe the software structure of the mobile terminal 100.

Refer to FIG. 3B. FIG. 3B is a block diagram of a software structure of a mobile terminal 100 according to an embodiment of this application.

In a layered architecture, software is divided into several layers, and each layer has a clear role and task. The layers communicate with each other through a software interface. In some embodiments, the Android system is divided into four layers: an application layer (abbreviated as an application layer), an application framework layer (abbreviated as a framework layer), an Android runtime (Android runtime) and system library, and a kernel layer from top to bottom.

The application layer may include a series of application packages. In some embodiments of this application, the application layer includes a first application, which is configured to provide a human-computer interaction interface for the mobile terminal 100 to control an IoT device 200. The first application may be, for example, a home application (for example, a "smart life" APP), or a dedicated application (for example, a smart speaker APP) of an IoT device.

In some examples, when the user moves the mobile terminal 100 close to the IoT device 200, if the IoT device 200 is in a non-networked state, the mobile terminal 100 automatically, enables the first application to perform networking on the IoT device 200. In the networking process, the first application may display a corresponding GUI for displaying a progress of a networking flow. After the networking succeeds, the first application displays a control interface of the IoT device 200. In this way, the user can operate the control interface of the IoT device 200 to control the IoT device 200.

When the user moves the mobile terminal 100 close to the IoT device 200, if the IoT device 200 is in a networked state, the mobile terminal 100 automatically enables the first application, and displays the control interface of the IoT device. In this way, the user can directly operate the control interface of the IoT device to control the IoT device 200.

In some other examples, the mobile terminal 100 may alternatively sink, to the framework layer, a capability and data in the first application that are related to the networking flow and the control flow. That is, a service in the first application that is related to the networking flow and the control flow is set as a system service, for example, an "IoT device management module". In this way, when the user moves the mobile terminal 100 close to the IoT device 200, if the IoT device 200 is in a non-networked state, the mobile terminal 100 enables a networking flow for the IoT device by invoking the IoT device management module. The IoT device management module may obtain networking information of the mobile terminal 100 from a setting application, and send the networking information to the IoT device. Optionally, in the networking process, the mobile terminal 100 may alternatively display a corresponding pop-up window in, for example, a semi-modal rendering manner, to display a progress of the networking flow. After the networking succeeds, the mobile terminal 100 may further display a control pop-up window of the IoT device. The user may operate the control pop-up window of the IoT device 200 to control the IoT device 200.

When the user moves the mobile terminal 100 close to the IoT device 200, if the IoT device 200 is in a networked state, the mobile terminal 100 invokes the IoT device management module, and displays the control pop-up window of the IoT device in, for example, a semi-modal rendering manner. In this way, the user can directly operate the control pop-up window of the IoT device 200 to control the IoT device 200.

That is, in this example, the mobile terminal 100 may implement networking and control on the IoT device without enabling the first application.

In addition, the application packages may include applications such as Camera, Gallery, Calendar, Phone, Map, Navigation, WLAN, Bluetooth, Music, Videos, and Messages.

The foregoing framework layer provides an application programming interface (application programming interface, API) and a programming framework for an application at the application layer. The framework layer includes some predefined functions.

As shown in FIG. 3B, the framework layer includes an IoT device management module, which is configured to perform networking on an IoT device, or control an IoT device according to an operation of a user.

In addition, the framework layer may further include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like. The content provider is configured to store and obtain data, and enable the data to be accessed by an application. The data may include a video, an image, audio, calls that are made and received, a browsing history and bookmarks, a phone book, and the like. The view system includes visual controls, such as a control for displaying a text and a control for displaying an image. The view system may be configured to construct an application. A display interface may include one or more views. For example, a display interface including a notification icon of Messages may include a text display view and a picture display view. The phone manager is configured to provide a communication function of the mobile terminal 100, for example, management of a call state (including answering, declining, or the like). The resource manager provides, for an application, various resources such as a localized character string, an icon, a picture, a layout file, and a video file. The notification manager enables an application to display, notification information in the status bar, and may be configured to transmit a notification-type message. The displayed information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is given, the electronic device vibrates, or the indicator light blinks.

The foregoing Android runtime includes a kernel library and a virtual machine. The Android runtime is responsible for scheduling and management of the Android system. The kernel library includes two parts: a function that needs to be invoked in java language and a kernel library of Android. The application layer and the framework layer run in the virtual machine. The virtual machine performs Java files at the application layer and the framework layer as binary files. The virtual machine is configured to perform functions such as object lifecycle management, stack management, thread management, security and exception management, and garbage collection.

The foregoing system library may include a plurality of function modules, for example, a surface manager (surface manager), a media library (Media Library), a 3D graphics processing library (for example, an OpenGL ES), and a 2D graphics engine (for example, an SGL).

The surface manager is configured to manage a display subsystem, and provide fusion of 2D and 3D layers for a plurality of applications. The media library supports playing and recording of a plurality of commonly used audio and video formats, static image files, and the like. The media library may support a plurality of audio and video encoding formats, for example, MPEG-4, H.264, MP3, AAC, AMR, JPG, and PNG. The 3D graphics processing library is configured to implement 3D graphics drawing, image rendering, composition, layer processing, and the like. The 2D graphics engine is a drawing engine for 2D drawing.

The foregoing kernel layer is a layer between hardware and software. The kernel aver includes at least a display driver, a camera driver, an audio driver, and a sensor driver.

Refer to FIG. 4. FIG. 4 is a schematic diagram of a structure of an IoT device 200 according to an embodiment of this application. The IoT device 200 may include one or more processors 210, one or more memories 220, one or more communication interfaces 230, a wireless communication module 240, one or more antennas, and the like. The processor 210, the memory 220, the communication interface 230, and the wireless communication module 240 are connected through a bus.

The processor 210 may include a general-purpose central processing unit (Central Processing Unit, CPU), a microprocessor, an application-specific integrated circuit (Application-Specific Integrated Circuit, ASIC), an integrated circuit configured to control program execution in the solutions of this application, or the like. In an example, the processor 210 may alternatively include a plurality of CPUs, and the processor 210 may be a single-core (single-CPU) processor or a multi-core (multi-CPU) processor. The processor herein may be one or more devices, circuits, or processing cores configured to process data (for example, computer program instructions).

The memory 220 may be configured to store a computer-executable program code. The executable program code includes instructions. The internal memory may include a program storage area and a data storage area. The program storage area may store an operating system, a program or instructions that need to be used in this embodiment of this application, and the like.

The communication interface 230 may be configured to communicate with another device or communications network, such as the Ethernet or a wireless local area network (wireless local area network, WLAN). In some examples, the IoT device 200 may alternatively not include the communication interface 230. This is not limited in this embodiment of this application.

The wireless communication module 240 may provide a solution, applied to the IoT device 200, to wireless communication including a WLAN (for example, Bluetooth, NFC, an infrared technology, and the like. The wireless communication module 240 may be one or more components integrating at least one communication processing module. The wireless communication module 240 receives an electromagnetic wave through the antenna, performs frequency modulation and filtering processing on an electromagnetic wave signal, and sends a processed signal to the processor 210. The wireless communication module 240 may further receive a to-be-sent signal from the processor 210, perform frequency modulation and amplification on the signal, and convert the signal into an electromagnetic wave through the antenna 2 for radiation.

In this embodiment of this application, the IoT device 200 has a very short distance (Very Short Distance) wireless communication capability. That is, another device can receive a wireless signal sent by the IoT device 200 only within a very short distance (for example, 30 cm or 10 cm). In a real use scenario, if a device can receive a very short distance wireless signal sent by the IoT device 200, it indicates that the device is very close to the IoT device 200, and the device may be considered as a trusted device of the IoT device 200. That is, the IoT device 200 authenticates a trusted device by sending a very short distance wireless signal.

Therefore, the IoT device 200 may send its device information in a very short distance wireless communication manner, for example, information such as a device type (prodID), a PIN, a MAC, and a networking status. In this way, when the mobile terminal 100 is located within a safe distance (for example, 30 cm or 10 cm) of the IoT device 200, the mobile terminal 100 may receive the device information of the IoT device 200. Then, the mobile terminal 100 may automatically network the IoT device 200 according to the device information of the IoT device 200, or display a control interface, deliver a corresponding control command to the IoT device 200 according to a control operation selected by a user, or the like.

In a specific example, the wireless communication module 240 may provide an NFC function. In this case, the IoT device 200 may send its device information through the NFC function. It should be further noted that the wireless communication module 240 may further provide a Wi-Fi or Bluetooth function. The IoT device 200 may communicate with the mobile terminal 100 through Wi-Fi or Bluetooth, for example, receive Wi-Fi network information sent by the mobile terminal and access a home network. The IoT device 200 may further communicate with a server 300, for example, receive a control command sent by the mobile terminal 100 through the server 300, and the like.

Figure 5A:
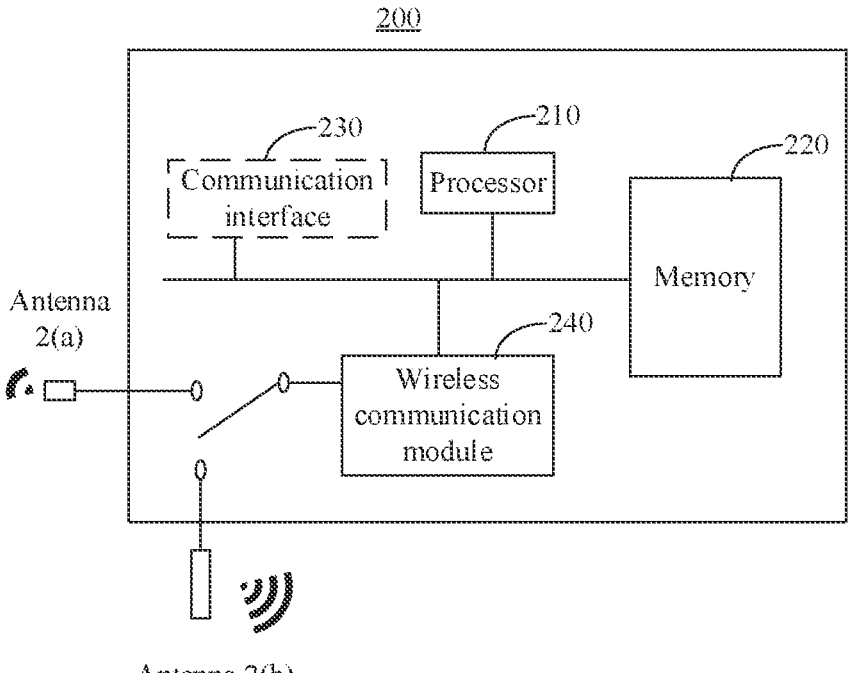
FIG. 5A is a schematic diagram of a structure of another IoT device according to an embodiment of this application.

In another specific example, the wireless communication module 240 has a short distance communication function in a manner of BLE, Wi-Fi Aware, or the like. For example, as shown in FIG. 5A, an IoT device 200 includes at least two antennas 2, which are respectively denoted as an antenna 2(*a*) (weak antenna) and an antenna 2(*b*) (normal antenna). The wireless communication module 240 may switch between the antenna 2(*a*) and the antenna 2(*b*). The transmitting distance of the antenna 2(*b*) is a distance A. The transmitting distance of the antenna 2(*a*) is a distance B, where the distance B is less than the distance A. For example, when the wireless communication module 240 switches to the antenna 2(*b*) to send a wireless signal, all other wireless devices located within the distance A (for example, 6 m to 10 m) of the IoT device 200 may receive the wireless signal. When the wireless communication module 240 switches to the antenna 2(*a*) to send a wireless signal, all other wireless devices located within the distance B (for example, 30 cm) of the IoT device 200 may receive the wireless signal. That is, when the IoT device 200 needs to send a very short distance wireless signal, the wireless communication module 240 may be controlled to connect to the antenna 2(*b*), to send the very short distance wireless signal. When the IoT device 200 does not need to send a very short distance wireless signal, the wireless communication module 240 may be controlled to connect to the antenna 2(*a*), to send a normal wireless signal. That is, the IoT device 200 may switch to the antenna 2(*h*), to send its IoT device information.

Figure 6A:
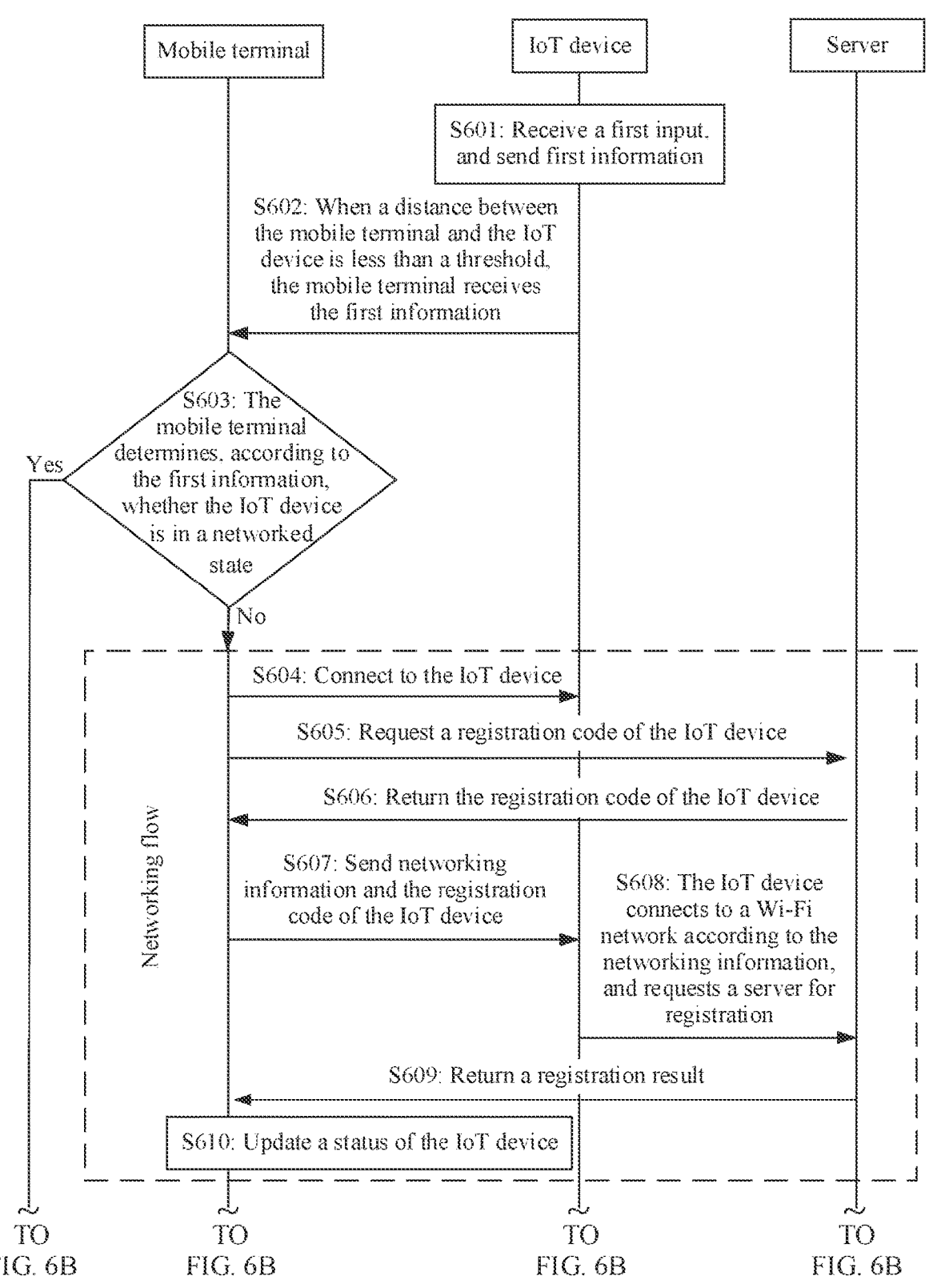
FIG. 6A and FIG. 6B are a schematic flowchart of an IoT device control method according to an embodiment of this application.
Figure 6B:
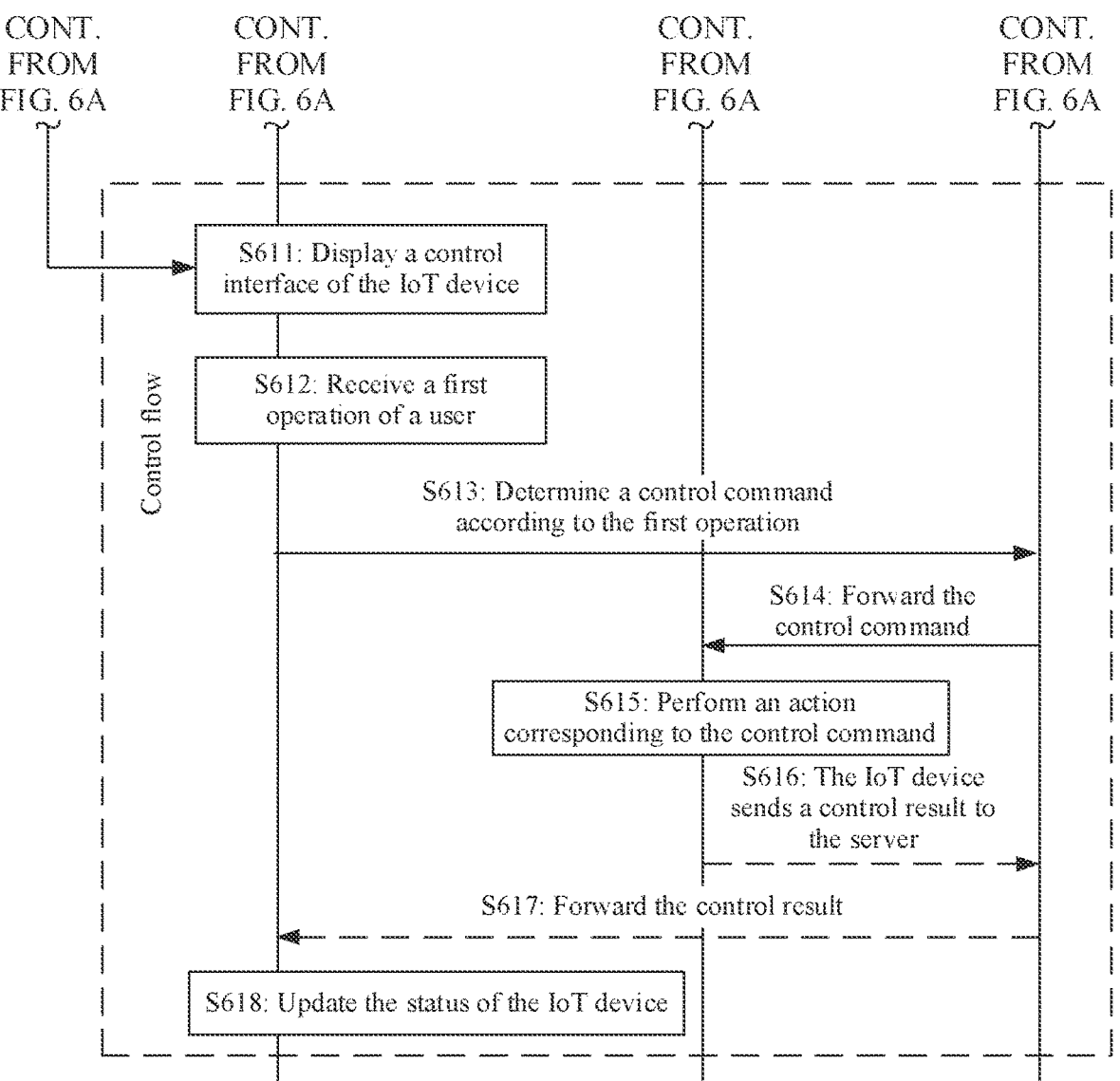

For another example, as shown in FIG. 513, an IoT device 200 may include a variable resistance circuit module 250 and at least one antenna 2. The variable resistance circuit module 250 may change a resistance value under control of the wireless communication module 240, so as to change the transmitting distance of an antenna. That is, when the resistance value of the variable resistance circuit module 250 is adjusted to a resistance value 1, the transmitting distance of the antenna is the distance A. When the resistance value of the variable resistance circuit module 250 is adjusted to a resistance value 2, the transmitting distance of the antenna is the distance B, where the distance B is less than the distance A. For example, when the resistance value of the variable resistance circuit module 250 is adjusted to the resistance value 1, the transmitting power of the antenna is first transmitting power (relatively high transmitting power). In this case, all other wireless devices located within the distance A (for example, 6 m to 10 m) of the IoT device 200 may receive the wireless signal. When the resistance value of the variable resistance circuit module 250 is adjusted to the resistance value 2, the transmitting power of the antenna is second transmitting power (relatively low transmitting power). In this case, all other wireless devices located within the distance B (for example, the distance B is 30 cm) of the IoT device 200 may receive the wireless signal. That is, when the IoT device 200 needs to send a very short distance wireless signal, the resistance value of the variable resistance circuit module 250 may be controlled to adjust to the resistance value 2, to send the very short distance wireless signal. When the IoT device 200 does not need to send a very short distance wireless signal, the resistance value of the variable resistance circuit module 250 may be controlled to adjust to the resistance value 1, to send a normal wireless signal. That is, the IoT device 200 may control the resistance value of the variable resistance circuit module 250 to adjust to the resistance value 2, to send its IoT device information. That is, in the other embodiments, when the resistance value of the variable resistance circuit module 250 is adjusted to the resistance value 1, the IoT device 200 is connected to the first antenna. When the resistance value of the variable resistance circuit module 250 is adjusted to the resistance value 2, the IoT device 200 is connected to the second antenna. The first antenna and the second antenna are the same, but the transmitting distance of the first antenna is greater than that of the second antenna. The transmitting distance of the second antenna is less than or equal to a preset safe distance, and the transmitting distance of the first antenna is greater than the preset safe distance. The transmitting distance of the first antenna and the transmitting distance of the second antenna are the foregoing distance A and the foregoing second distance B, respectively, FIG. 6A and FIG. 6B are a schematic flowchart of an IoT device management method according to an embodiment of this application. The method specifically includes the following steps.

S601: An IoT device sends first information in response to receiving, by the IoT device, a first input, where the first information includes IoT device information.

The IoT device information includes information such as a device model (prodID), a personal identification number (Personal Identification Number) PIN, a MAC address, and a networking status (or referred to as a registration status). Optionally, the IoT device may further include other information, for example, a vendor, a room to which the IoT device belongs, and the like. The device model may be used for identifying the IoT device. Generally, the IoT device is named by the device model, and a device icon corresponding to the IoT device is determined according to the device model. The PIN is a root key for key negotiation in the subsequent networking process, and is used for security authentication. The MAC address is a unique identifier of the IoT device, and is used for distinguishing other IoT devices. The networking status is used for identifying whether the IoT device is networked, and the mobile terminal performs different flows subsequently according to the networking status.

Figure 5B:
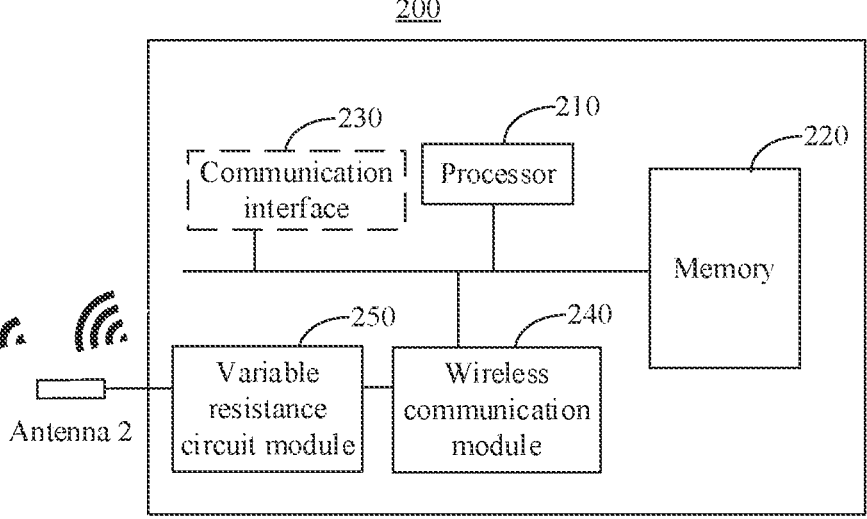
FIG. 5B is a schematic diagram of a structure of still another IoT device according to an embodiment of this application.

During specific implementation, when the IoT device receives the first input, the IoT device broadcasts and sends the first information in a short-range communication manner. For example, the IoT device sends the first message periodically in a manner of NFC, Wi-Fi Aware, Bluetooth low energy, or the like. The specific sending manner may refer to the foregoing descriptions of related content in FIG. 4, FIG. 5A, and FIG. 5B. Details are not described herein again. The first input may be a specific operation performed by a user on the IoT device, for example, pressing a specific key, operating a specific control on a touchscreen, executing a specific mid-air gesture, inputting a voice command, and the like. The first input may alternatively be an instruction sent by another electronic device, for example, a user operates a control device (for example, a remote control) of the IoT device, so that the control device sends the instruction to the IoT device or sends the instruction to the IoT device through a server. The first information may be carried in one or more messages. This is not specifically limited in this embodiment of this application.

In some embodiments, the IoT device may alternatively write IoT device information into firmware, and when a mobile terminal or the like is close to the IoT device, the first information may be read. Alternatively, the IoT device may start to broadcast the first information after receiving a user instruction that the IoT device enters a networking mode. Alternatively, the IoT device may start to broadcast the first information after being powered on.

A smart speaker is used as an example of the IoT device. For example, after a user purchases a new smart speaker, the smart speaker is connected to a power supply. In response to pressing an on/off key by the user, the smart speaker is turned on or the smart speaker is automatically turned on. After the smart speaker is turned on, the smart speaker starts to broadcast, in a preset period, the first information shown in Table 1. In this case, the networking status of the smart speaker is non-networked. The first input is a power-on operation, or an operation of pressing an on/of key by a user. It should be further noted that the specific content of the first information in Table 1 is merely an example, and does not constitute a limitation on the content of the first information.

TABLE 1

| Device model (ProdID) | PIN | MAC Address | Networking status (registration status) | Vendor | Room | ... |
|---|---|---|---|---|---|---|
| Smart speaker Sound X | PIN-1 | MAC-1 | Non-networked (unregistered) | HUAWEI | Living room | ... |

Alternatively, after the smart speaker is turned on, in response to a user instruction of entering a networking mode (for example, continuously pressing the on/off key twice), the smart speaker enters the networking mode, and starts to send the first information shown in Table 1. In this case, the first input is an operation of the user instruction of entering the networking mode.

For another example, the smart speaker has succeeded in networking. When the smart speaker is restarted after being turned off, the smart speaker may automatically send first information shown in Table 2. In this case, the networking status of the smart speaker is networked. The first input is an operation of restarting the smart speaker by the user. It should be further noted that the first information in Table 2 is merely an example, and does not constitute a limitation on the content of the first information,

TABLE 2

| Device model (ProdID) | PIN | MAC Address | Networking status (registration status) | Vendor | Room | ... |
|---|---|---|---|---|---|---|
| Smart speaker Sound X | PIN-1 | MAC-1 | Networked (registered) | HUAWEI | Living room | ... |

Optionally, in some other embodiments, after the IoT device receives the first input, or after the IoT device sends a first message, the IoT device may also prompt the user to move the mobile terminal close to the IoT device, so that the mobile terminal receives the first message sent by the IoT device in a very short distance communication manner. The prompting manner may be one or more of playing a prompt voice, blinking an indicator light, and displaying a prompt interface. Alternatively, the IoT device notifies, in a specification, a user to move a mobile terminal connected to a network close to the IoT device, to complete a networking flow or a control flow. A specific prompting manner is not limited in this embodiment of this application.

S602: A mobile terminal receives the first information when the distance between the mobile terminal and the IoT device is less than or equal to a distance threshold.

When the user needs to use the mobile terminal to perform networking for the IoT device or control the IoT device, the user may move the mobile terminal close to the IoT device, so that the distance between the mobile terminal and the IoT device is less than or equal to the distance threshold. The distance threshold is, for example, 10 cm, 30 cm, or the like. For example, the user may use the mobile terminal to touch an NFC tag of the IoT device. In this case, the distance between the mobile terminal and the IoT device is less than the distance threshold, and the first information sent by the IoT device through NFC is received. The NFC tag is used for indicating a location at which the IoT device is configured with an NFC communication module.

It may be understood that when the IoT device sends first information in the short-range communication manner, another device (for example, the mobile terminal) can receive the first information only within a very short distance (that is, the distance threshold) from the IoT device. That is, in a real use scenario, if a device can receive the first information sent by the IoT device, it indicates that the device is close to the IoT device, and the device may be considered as a trusted device of the IoT device. In this specification, a distance range in which a very short distance wireless signal sent by the IoT device can be received may be referred to as a safe distance. That is, a safe very short wireless communication distance is used in this embodiment of this application to physically ensure security of sending the first information by the IoT device.

S603: The mobile terminal determines, according to the first information, whether the IoT device is in a networked state. When the IoT device is in a non-networked state, the mobile terminal performs a networking flow on the IoT device, that is, performs step S604 to step S610. Optionally, after step S604 to step S610 are performed, step S611 to step S618 may further continue to be performed. When the IoT device is in the networked state, the mobile terminal displays a control interface of the IoT device, and sends a corresponding control command to the IoT device according to an operation of a user, that is, performs step S611 to step S618.

S604: The mobile terminal establishes a communication connection to the IoT device.

In some embodiments, the first information sent by the IoT device includes a device model (for example, a device name is the same as the device model), a MAC address, a PIN, and the like. The mobile terminal may automatically establish a Wi-Fi connection, a Bluetooth connection, or the like to the IoT device according to the device name, the MAC address, and the like.

In some other embodiments, the user may alternatively manually connect the mobile terminal to the IoT device by operating the mobile terminal or the IoT device. For example, the user opens system settings of the mobile terminal, selects to enable a Wi-Fi function, and selects to connect to the IoT device, and the mobile terminal establishes a Vi-Fi connection to the IoT device. Alternatively, the user opens system settings of the mobile terminal, selects to enable a. Bluetooth function, and selects to connect to the IoT device, and the mobile terminal establishes a Bluetooth connection to the IoT device.

Certainly, the mobile terminal and the IoT device may alternatively be connected in a wired manner. The connection manner between the mobile terminal and the IoT device is not limited in this embodiment of this application.

S605: The mobile terminal requests a registration code of the IoT device from a server.

Before the mobile terminal performs networking on the IoT device, the mobile terminal is connected to a Wi-Fi network and can access the server through the Wi-Fi network. The mobile terminal sends a request to the server to request the server to generate the registration code for the IoT device. The request sent by the mobile terminal to the server may carry a device model of the mobile terminal, a login account of the mobile terminal, a device model of the IoT device, a MAC address, and the like.

S606: The server returns the registration code of the IoT device to the mobile terminal.

After receiving the request sent by the mobile terminal, the server generates, according to the device model of the IoT device, the MAC address, and the like, an identifier of the IoT device (that is, a device ID) for uniquely identifying the IoT device. In addition, the server generates the registration code of the IoT device according to the device model of the mobile terminal, the login account of the mobile terminal, and the like. Then, the server returns the generated registration code and the device ID to the mobile terminal.

S607: The mobile terminal sends networking information and the registration code of the IoT device to the IoT device.

The networking information includes information such as a service set identifier (Service Set Identifier, SSID) and password of a Wi-Fi connected to the mobile terminal. In some examples, a setting application in the mobile terminal includes the networking information.

In some examples, after obtaining the registration code of the IoT device, the mobile terminal sends, to the IoT device, a request for creating a session, the request carrying the registration code of the IoT device and the PIN of the IoT device. The IoT device creates session information (for example, a session identifier sessionID) with the mobile terminal, and returns the session information to the mobile terminal. Subsequently, the mobile terminal sends the locally stored networking information to the IoT device by using the session information.

S608: The IoT device connects to the Wi-Fi network according to the networking information, and requests the server for registration.

After receiving the networking information, the IoT device may connect to the Wi-Fi network and access the server. The IoT device requests the server for registration according to the registration code. The server binds the identifier of the IoT device to the account of the mobile terminal. Subsequently, when receiving the control command for the IoT device that is sent by the device logging in to the account, the server forwards the control command to the IoT device, so that the IoT device performs an action corresponding to the control command.

S609: The server returns a registration result to the mobile terminal.

S610: The mobile terminal updates the state of the IoT device according to the registration result.

For example, the mobile terminal updates the networking status of the IoT device to change from a non-networked state to a networked state. It may be understood that there is no related information of the IoT device in the first application before networking is not performed on the IoT device. After the networking on the IoT device is completed, the first application stores related information of the IoT device. In this case, the user may control the IoT device through the first application.

It should be noted that in the networking flow of the IoT device, the mobile terminal may alternatively display some graphical user interfaces (Graphical User Interface, GUI) in real time, to notify the user of a progress of the networking flow. Specifically, the mobile terminal may automatically enable the first application, and display related GUIs in the first application. Alternatively, the mobile terminal may not enable the first application, but directly display a corresponding pop-up window on a current interface (for example, a desktop) of the mobile terminal in, for example, a semi-modal rendering manner. This is not limited in this embodiment of this application.

Figure 7A:
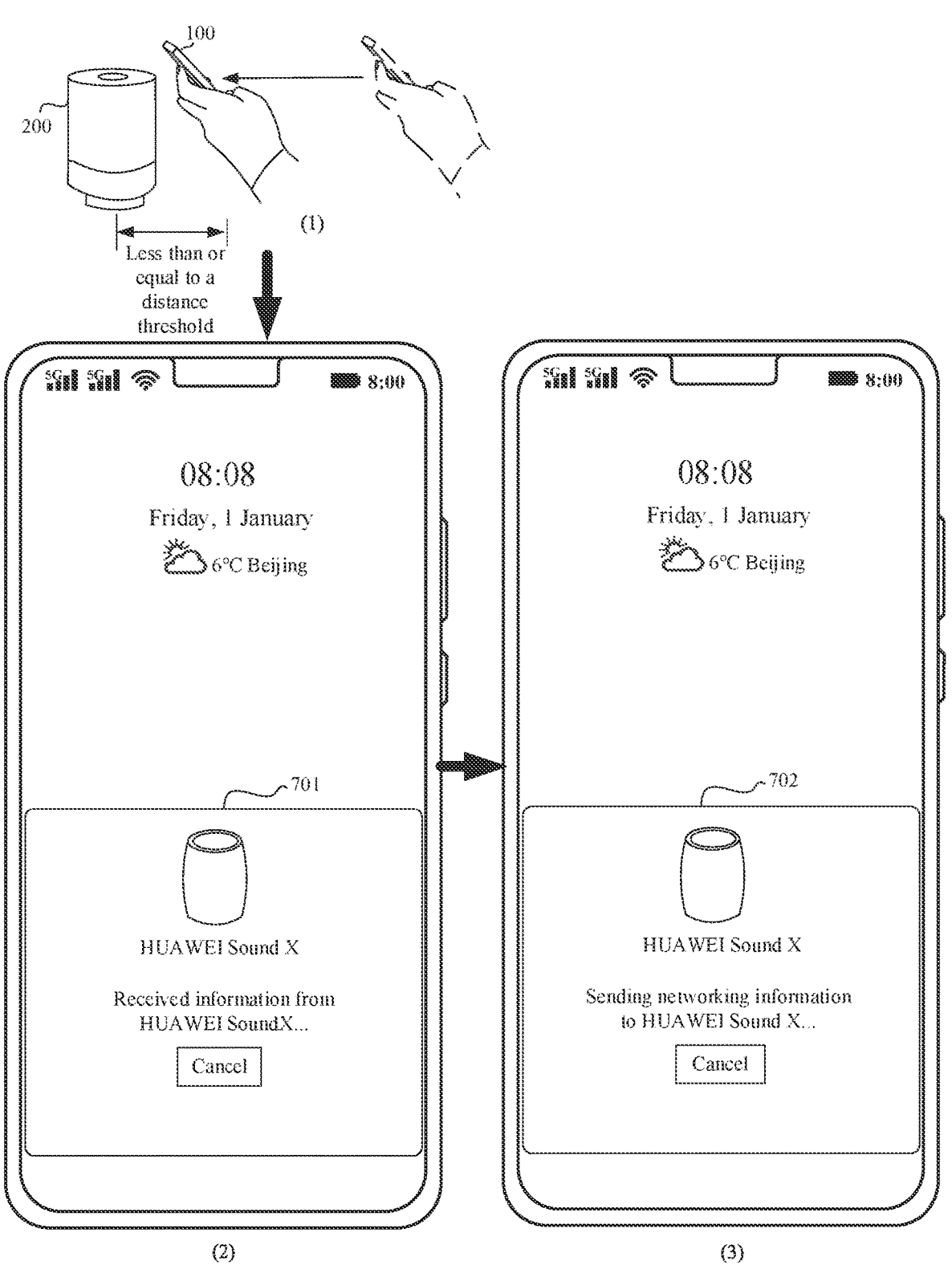
FIG. 7A is a schematic diagram of graphical user interfaces of still some mobile terminals according to an embodiment of this application.

The mobile terminal is a mobile phone and the IoT device is a smart speaker as an example for description. As shown in (1) of FIG. 7A, when the user moves the mobile phone close to the smart speaker, and the distance between the mobile phone and the smart speaker is less than or equal to a distance threshold, the mobile phone can read first information of the smart speaker. In this case, the mobile phone may display a GUI shown in (2) of FIG. 7A, where a pop-up window 701 is used for prompting the user that the first information of the smart speaker is being read. The first information includes a device model, a MAC address, a PIN, a networking status, and the like. After receiving the first information, the mobile phone determines, according, to the networking status, that the smart speaker is in a non-networked state, and then the mobile phone automatically enables a networking flow for the smart speaker. When the mobile phone applies to the server for a registration code of the smart speaker and the mobile phone sends networking information to the smart speaker, the mobile phone may alternatively display a corresponding interface to prompt the user of the current networking progress. For example, the mobile phone may display a GUI shown in (3) of FIG. 7A. A pop-up window 702 is used for prompting the user that the mobile phone is sending the networking information to the smart speaker and the like. For another example, the mobile phone may display a GUI shown in (1) in FIG. 7B-1. A pop-up window 703 is used for prompting the user that the mobile phone is applying to the server for the registration code of the smart speaker. After the smart speaker is successfully registered, the mobile phone may further display a GUI shown in (2) in FIG. 7B-1. A pop-up window 704 is used for prompting that the smart speaker is successfully registered with the account that is currently logged in to by the mobile phone. It should be noted that the mobile phone may display more or fewer interfaces than the foregoing GUIs. This is not limited in this embodiment of this application.

It should be further noted that the foregoing step S604 to step S610 are an example of the networking flow of the IoT device. A sequence of performing some steps may also change. For example, step S604 may be performed simultaneously with step S605, or may be performed after step S605. In addition, the networking flow of the IoT device may include more or fewer steps. For example, after step S607, the IoT device may further return a response to the mobile terminal when receiving the registration code sent by the mobile terminal, to notify the mobile terminal that the registration code has been received.

It can be learned that after the mobile terminal is close to the IoT device, if the IoT device is in a non-networked state, the mobile terminal may automatically perform networking for the IoT device. In addition, in the networking flow of the IoT device, the user does not need to perform some complex operations, such as scanning a tag of the IoT device and selecting a Wi-Fi network password and a PIN of the IoT device. It can be learned that the method provided in this embodiment of this application simplifies user operations, and achieves an effect of unburdening networking.

Further, after the mobile terminal succeeds in the networking, the user may directly control the mobile terminal. Alternatively, in step S603, if the mobile terminal determines, according to the first information, that the IoT device is in the networked state, step S611 and subsequent steps may be directly performed.

S611: The mobile terminal displays a control interface of the IoT device.

In some embodiments, the mobile phone may display, in a currently displayed interface, a pop-up window including the control interface of the IoT device. In some examples, the control interface of the IoT device may be a shortcut operation interface, that is, only brief device information of the IoT device and a main control function are included.

The mobile terminal is still a mobile phone and the IoT device is still a smart speaker as an example. For example, the mobile phone displays a GUI shown in (3) in FIG. 7B-2. A pop-up window 711 is a control interface of the smart speaker. The pop-up window 711 includes a device icon 705 (for example, an icon of the smart speaker), a device name (for example, HUAWEI Sound X), a networking status indication 706 of the smart speaker, a play control function 707, a Bluetooth function control 708 of the smart speaker, a volume 709, and the like. The play control function 707 includes a music name, a singer, an album cover, a play mode (single cycle, playlist cycle, or random play), previous, a play (or pause) control, next, a favorite control, and the like, Optionally, the pop-up window 711 may further include a "view more" control 710. In response to a user operation on the "view more" control 710, the mobile phone displays more functions of the smart speaker in the pop-up window 711, or the mobile phone automatically opens the first application and enters a control interface of the smart speaker, that is, displays a control interface 714 shown in (4) in FIG. 7B-2. The control interface 714 includes more function controls than those in the pop-up window 711. For example, in the play control function, the control interface 714 further includes a control 712 for viewing lyrics, which may be configured to display lyrics of currently played music. For another example, a control area 713 in the control interface 714 further includes controls for entering function modules such as voice skills, XX tells stories, XX children's songs, and listen to novels.

Figures 1, 7B:
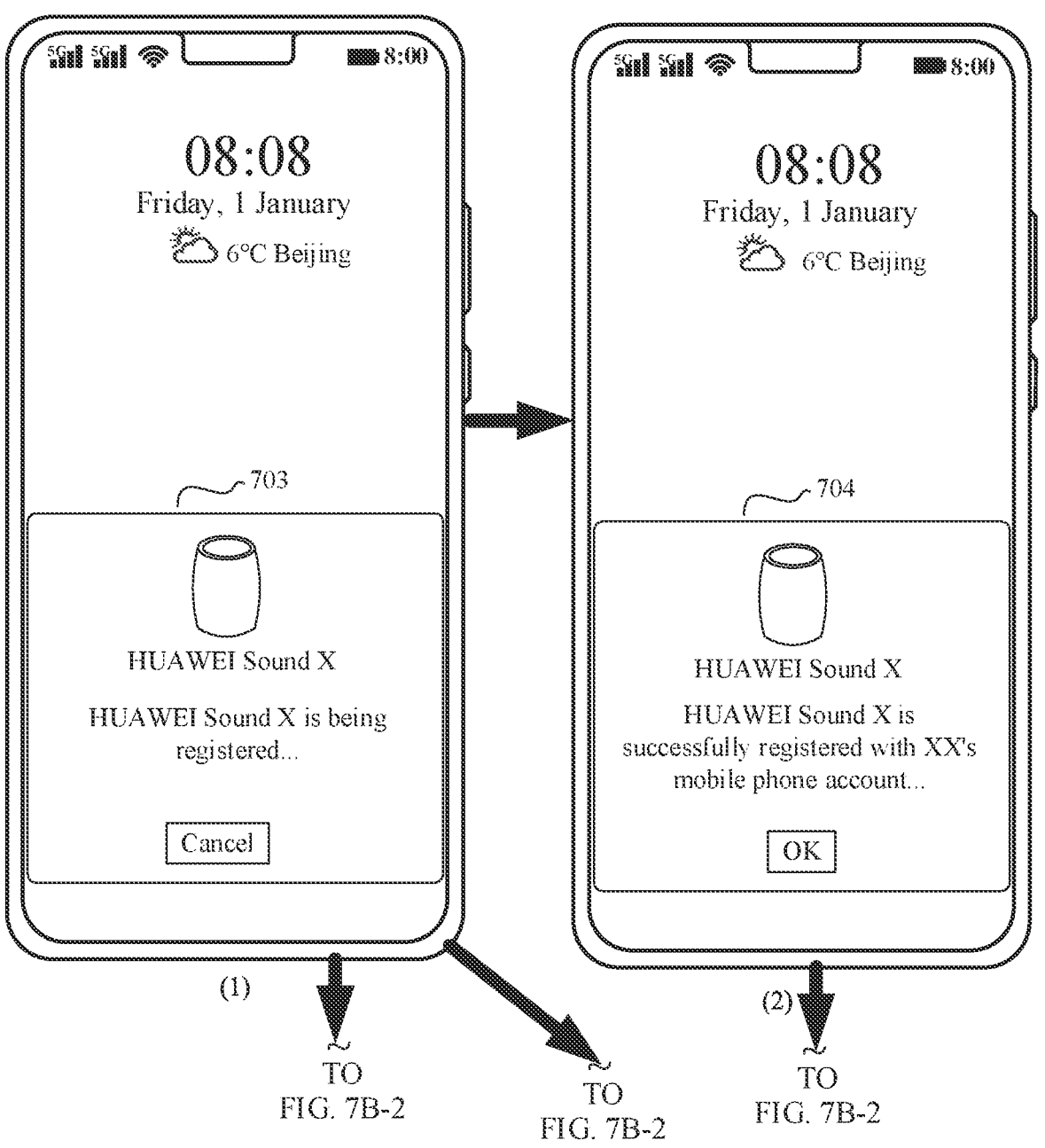
Figures 2, 7B:
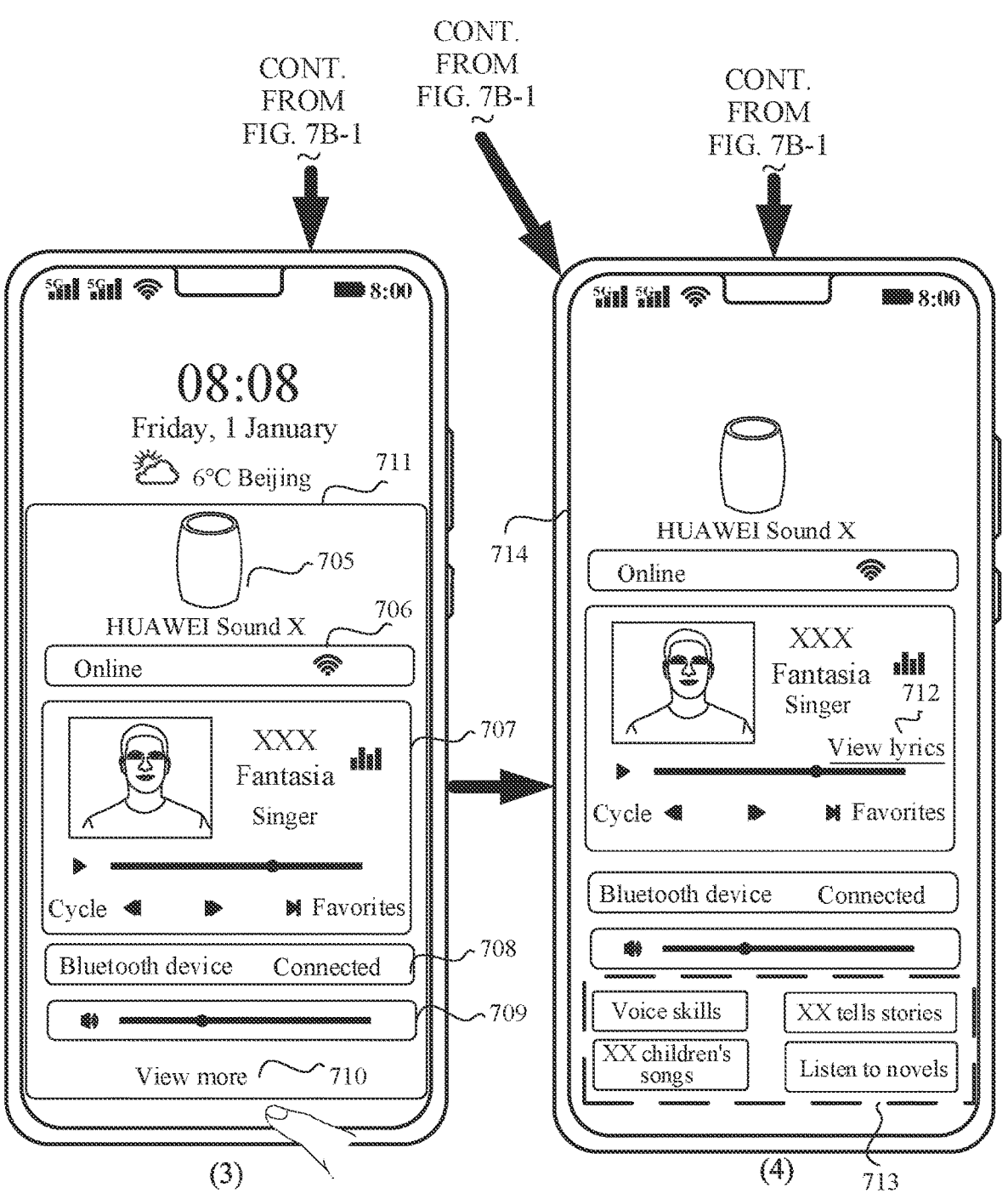

Certainly, in some other embodiments, after completing the networking flow for the smart speaker, the mobile phone may also automatically open the first application, and display the control interface 714 shown in (4) in FIG. 7B-2.

It may be understood that the mobile terminal controls the IoT device in a GUI management mode, which may not be affected by noise of a surrounding, environment and the like, has better robustness, and helps control the IoT device more accurately.

In still some embodiments, the mobile phone may alternatively use a VUI management mode to prompt the user to control the IoT device by using a voice. For example, as shown in (1) of FIG. 7C, the mobile phone plays a voice prompt. It should be noted that, in an existing VUI management mode, a user needs to wake up a control device (that is, a mobile terminal) by speaking a wake-up word, and then receive a voice command of the user. In this solution, the user does not need to speak any wake-up word. In addition, in the existing VUI management mode, a device model of an IoT device generally represents the IoT device. For example, the user says "turn on the smart speaker". The smart speaker is a device that the user desires to control. However, when there are a plurality of IoT devices of a same device model in a surrounding environment, the control device cannot identify an IoT device that the user desires to enable. Then, in the solution of this application, when the user moves the mobile terminal close to an IoT device, the first information sent by the IoT device includes not only a device model of the IoT device, but also a MAC address of the IoT device, which may be used for identifying the IoT device that the user currently desires to control.

S612: The mobile terminal receives a first operation of the user.

The user may perform an operation on the control interface displayed on the mobile terminal, or the user may directly input a voice command. For example, the user may click a play control in a play control function 707 in the pop-up window shown in (3) in FIG. 7B-2. For another example, as shown in (2) of FIG. 7C, the user may say "play a next song" to the mobile phone.

S613: The mobile terminal determines a control command for the IoT device according to the first operation of the user, and sends the control command to the server.

S614: The server forwards, to the IoT device, the control command sent by the mobile terminal.

The server determines, according to the control command sent by the mobile terminal and control device information recorded by the server for the IoT device, that the mobile terminal is a control device for the IoT device, and forwards the control command to the IoT device.

S615: The IoT device performs an action corresponding to the control command.

S616: The IoT device sends a control result to the server.

S617: The server forwards the control result to the mobile terminal.

S618: The mobile terminal updates the state of the IoT device according to an execution result.

Figure 7C:
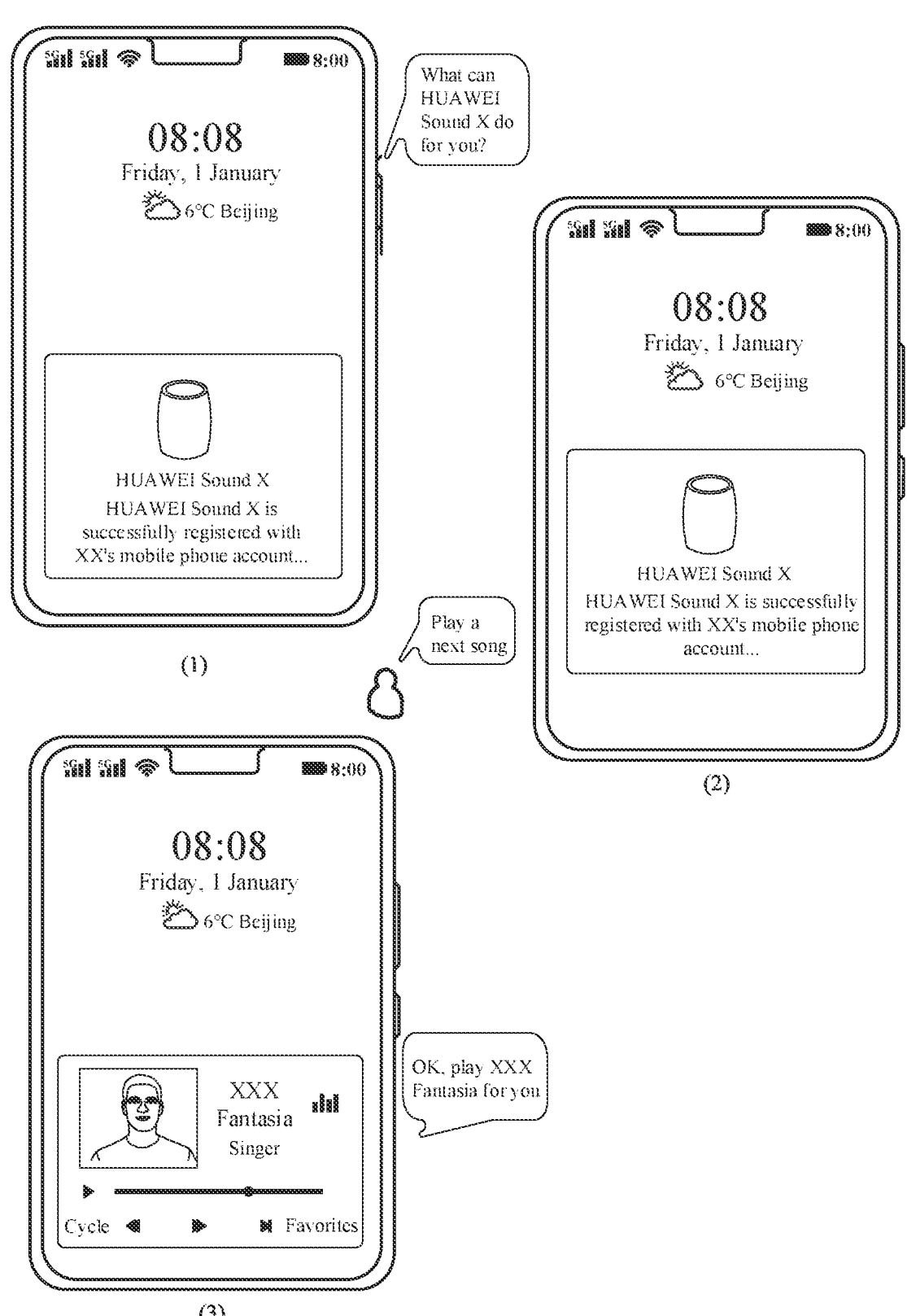
FIG. 7C is a schematic diagram of voice user interfaces of still some mobile terminals according to an embodiment of this application.

For example, as show in (3) of FIG. 7C, the mobile phone plays a voice to prompt that a next song is being played.

It can be learned that after the mobile terminal is close to the IoT device, if the IoT device is in a non-networked state, the mobile terminal may automatically perform networking for the IoT device, and display the control interface. If the IoT device is in a networked state, the mobile terminal may display the control interface. In this way, the user may directly operate the control interface and start to control the IoT device. That is, the method provided in this embodiment of this application can automatically perform different flows, networking, or control according to the networking status of the IoT device, thereby simplifying user operations, achieving a one-click touch control experience, and helping enhance user stickiness.

In addition, when being close to the IoT device, the mobile terminal may obtain the unique MAC address of the IoT device. When there are a plurality of IoT devices of a same device model in a surrounding environment, the mobile terminal may alternatively perform network distribution and operations on the IoT device close to the user.

Figures 8, 9:
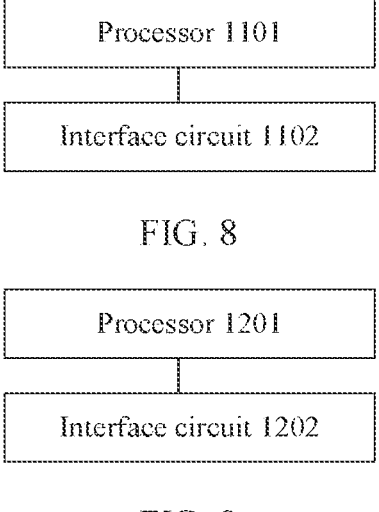
FIG. 8 is a schematic diagram of a structure of a chip system according to an embodiment of this application.
FIG. 9 is a schematic diagram of a structure of another chip system according to an embodiment of this application.

An embodiment of this application further provides a chip system. As shown in FIG. 8, the chip system includes at least one processor 1101 and at least one interface circuit 1102. The processor 1101 and the interface circuit 1102 may be interconnected through a line. For example, the interface circuit 1102 may be configured to receive a signal from another apparatus (for example, a memory of a mobile terminal 100). For another example, the interface circuit 1102 may be configured to send a signal to another apparatus (for example, the processor 1101). For example, the interface circuit 1102 may read instructions stored in the memory, and send the instructions to the processor 1101. When the instructions are executed by the processor 1101, an electronic device is enabled to perform steps performed by the mobile terminal 100 (for example, a mobile phone) in the foregoing embodiments. Certainly, the chip system may further include another discrete device. This is not specifically limited in this embodiment of this application.

An embodiment of this application further provides a chip system. As shown in FIG. 9, the chip system includes at least one processor 1201 and at least one interface circuit 1202. The processor 1201 and the interface circuit 1202 may be interconnected through a line. For example, the interface circuit 1202 may be configured to receive a signal from another apparatus (for example, a memory of an IoT device 200). For another example, the interface circuit 1202 may be configured to send a signal to another apparatus (for example, the processor 1201). For example, the interface circuit 1202 may read instructions stored in the memory, and send the instructions to the processor 1201. When the instructions are executed by the processor 1201, an electronic device is enabled to perform steps performed by the mobile terminal 100 (for example, a smart speaker) in the foregoing embodiments. Certainly, the chip system may further include another discrete device. This is not specifically limited in this embodiment of this application.

An embodiment of this application further provides an apparatus. The apparatus is included in a mobile terminal, and the apparatus has a function of implementing behavior of the mobile terminal in any method in the foregoing embodiments. The function may be implemented by hardware, or may be implemented by hardware executing corresponding software. The hardware or the software includes at least one module or unit corresponding to the foregoing function, for example, a receiving module or unit, a sending module or unit, and a determining module or unit.

An embodiment of this application further provides an apparatus. The apparatus is included in an IoT device, and the apparatus has a function of implementing behavior of the IoT device in any method in the foregoing embodiments. The function may be implemented by hardware, or may be implemented by hardware executing corresponding software. The hardware or the software includes at least one module or unit corresponding to the foregoing function, for example, a receiving module or unit, a sending module or unit, and a determining module or unit.

An embodiment of this application further provides a computer storage medium, including computer instructions. When the computer instructions are run on a mobile terminal, the mobile terminal is enabled to perform any method in the foregoing embodiments.

An embodiment of this application further provides a computer storage medium, including computer instructions. When the computer instructions are run on an IoT device, the IoT device is enabled to perform any method in the foregoing embodiments.

An embodiment of this application further provides a computer program product. When the computer program product is run on a computer, the computer is enabled to perform any method in the foregoing embodiments.

An embodiment of this application further provides a graphical user interface on a mobile terminal. The mobile terminal has a display, a memory, and one or more processors. The one or more processors are configured to perform one or more computer programs stored in the memory. The graphical user interface includes the graphical user interface displayed when the mobile terminal performs any method in the foregoing embodiments.

It may be understood that, to implement the foregoing functions, the foregoing terminal includes a corresponding hardware structure and/or software module for executing each function. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on a particular application and a design constraint of a technical solution. A person skilled in the art may use different methods to implement the described functions for each particular application, but it should not be considered that the implementation goes beyond the scope of embodiments of this application.

In embodiments of this application, the terminal or the like may be divided into function modules according to the foregoing method examples. For example, each function module may be obtained through division to correspond to each function; or two or more functions may be integrated into one processing module. The integrated module may be implemented in a form of hardware, or may be implemented in a form of a software function module. It should be noted that, in embodiments of this application, division into the modules is an example, is merely logical function division, and may be other division in an actual implementation.

The foregoing descriptions about implementations allow a person skilled in the art to clearly understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a specific working process of the foregoing system, apparatus, and unit, reference may be made to a corresponding process in the foregoing method embodiments, and details are not described herein again.

Function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes any medium that can store a program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:
1. A mobile terminal comprising:
a memory configured to store instructions; and
a processor coupled to the memory and configured to execute the instructions to cause the mobile terminal to:
receive, from an internet of things (IoT) device via short-range communication, a first message comprising an identifier of the IoT device and a registration status of the IoT device;

when the registration status indicates that the IoT device is not registered:

request, from a server, a registration code of the IoT device;

receive, from the server, the registration code of the IoT device; and send, to the IoT device, the registration code and locally-stored networking information, wherein the registration code and the locally-stored networking information enable the IoT device to apply to the server for registration;

display a first control interface comprising a control for controlling the IoT device when the registration status indicates that the IoT device is registered; and play a voice prompt to indicate that the IoT device may be controlled through voice commands when the registration status indicates that the IoT device is registered.

2. The mobile terminal of claim 1, wherein the identifier comprises one or more of a device model, a personal identification number (PIN), or a media access control (MAC) address.

3. The mobile terminal of claim 1, wherein after sending the registration code and the locally-stored networking information, the processor is further configured to execute the instructions to cause the mobile terminal to:

receive, from the server, a second message indicating that the IoT device is registered successfully;

update, in response to receiving the second message, the registration status to "registered"; and further display the registration status "registered".

4. The mobile terminal of claim 1, wherein the processor is further configured to execute the instructions to cause the mobile terminal to automatically enable a first application and display a second control interface of the first application.

5. The mobile terminal of claim 1, wherein the processor is further configured to execute the instructions to cause the mobile terminal to further play the voice prompt when the registration status indicates that the IoT device is registered and after receiving the first message.

6. The mobile terminal of claim 3, wherein after receiving the second message, the processor is further configured to execute the instructions to cause the mobile terminal to play, in response to updating the registration status to "registered", a voice prompt.

7. An internet of things (IoT) device comprising:

a memory configured to store instructions; and a processor coupled to the memory and configured to execute the instructions to cause the IoT device to:

receive an input;

send, in response to the input, to a mobile terminal and via short-range communication, a first message comprising an identifier of the IoT device and a registration status of the IoT device;

receive, from the mobile terminal and in response to the first message, a registration code of the IoT device and networking information, wherein a server is the source of the registration code sent to the mobile terminal; and apply to the server for registration after receiving the registration code and the networking information.

8. The IoT device of claim 7, wherein the processor is further configured to execute the instructions to cause the IoT device to prompt, using a prompting manner, a user to decrease a distance between the mobile terminal and the IoT device after receiving the input or before sending the first message, wherein a prompting manner comprises one or more of playing a voice prompt, blinking an indicator light, or displaying a prompt interface.

9. The IoT device of claim 7, wherein the identifier comprises one or more of a device model, a personal identification number (PIN), or a media access control (MAC) address.

10. A computer program product comprising computer-executable instructions that are stored on a non-transitory computer-readable storage medium and that, when executed by a processor, cause a mobile terminal to:

receive, from an internet of things (IoT) device via short-range communication, a first message comprising an identifier of the IoT device and a registration status of the IoT device;

when the registration status indicates that the IoT device is not registered:

request, from a server, a registration code of the IoT device;

receive, from the server, the registration code of the IoT device; and send, to the IoT device, the registration code and locally-stored networking information, wherein the registration code and the locally-stored networking information enable the IoT device to apply to the server for registration;

display a first control interface comprising a control for controlling the IoT device when the registration status indicates that the IoT device is registered; and play a voice prompt to indicate that the IoT device may be controlled through voice commands when the registration status indicates that the IoT device is registered.

11. The computer program product of claim 10, wherein the identifier comprises one or more of a device model, a personal identification number (PIN), or a media access control (MAC) address.

12. The computer program product of claim 10, wherein after sending the registration code and the locally-stored networking information, the computer-executable instructions further cause the mobile terminal to:

receive, from the server, a second message indicating that the IoT device is registered successfully;

update, in response to the second message, the registration status to "registered"; and further display the registration status "registered".

13. The computer program product of claim 10, wherein the computer-executable instructions further cause the mobile terminal to invoke a system service and display a pop-up window comprising the first control interface.

14. The computer program product of claim 10, wherein the computer-executable instructions further cause the mobile terminal to further play the voice prompt when the registration status indicates that the IoT device is registered and after receiving the first message.

15. The computer program product of claim 12, wherein after receiving the second message, the computer-executable instructions further cause the mobile terminal to play, in response to updating the registration status to "registered", a voice prompt.

16. A computer program product comprising computer-executable instructions that are stored on a non-transitory computer-readable storage medium and that, when executed by a processor, cause an internet of things (IoT) device to:

receive a first input;

send, via short-range communication, a first message comprising an identifier of the IoT device and a registration status of the IoT device, wherein the identifier and the registration status enable a mobile terminal to apply for a registration code of the IoT device and return, to the IoT device, the registration code and networking information stored in the mobile terminal, and wherein a server is the source of the registration code; and apply to the server for registration after receiving the registration code and the networking information.

17. The computer program product of claim 16, wherein after receiving the first input or before sending the first message, the computer-executable instructions further cause the IoT device to prompt a user to decrease distance between the mobile terminal and the IoT device, wherein a prompting manner comprises one or more of playing a voice prompt, blinking an indicator light, or displaying a prompt interface.

18. The computer program product of claim 16, wherein the identifier comprises one or more of a device model, a personal identification number (PIN), or a media access control (MAC) address.

19. The mobile terminal of claim 1, wherein the request to the server comprises the identifier of the IoT device, and wherein the registration code received from the server is uniquely associated with the identifier of the IoT device and enables the server to bind the IoT device to an account associated with the mobile terminal upon receiving the registration code from the IoT device.

20. The mobile terminal of claim 1, wherein the registration code enables the IoT device to establish an initial registration with the server for a first time.

* * * * *